Patented July 8, 1947

2,423,565

UNITED STATES PATENT OFFICE 2,423,565

POLYVINYL ACETAL RESIN COMPOSITIONS

Ernest A. Rodman, Newburgh, N. Y., assignor to E. I. du Pont de Nemours & Company, Wilmington, Del., a corporation of Delaware No Drawing. Application September 24, 1942, Serial No. 459,527

3 Claims. (Cl. 260—42)

This invention relates to synthetic resin compositions and, more particularly, to compositions containing polyvinyl acetal resins and certain monohydric alcohol-urea-formaldehyde reaction products that are useful as protective coatings.

Heretofore, it has been customary to coat fabrics with compositions containing cellulose derivatives, natural and synthetic resins, rubber, drying oils, and the like for a great many purposes, depending on the use of the coated fabric. Resins suitable for fabric coatings may be divided into two classes—heat setting resins and thermoplastic resins. In coated fabrics used for wearing apparel, synthetic resins have been found to have great utility. However, fabrics coated with heat setting resins are not adapted for general use as wearing apparel since they do not provide flexible coatings over a wide temperature range, and fabrics coated with thermoplastic resins are not entirely satisfactory for certain uses since they tend to become sticky at elevated temperatures.

In Kingsley Patent No. 2,268,121, it is proposed to prepare raincoat material by coating a fabric with a blend of polyvinyl butyral resin and a urea-formaldehyde resin, together with a wax. While the patented invention overcomes many disadvantages of the prior art, it does not quite meet the present day requirements of coated fabrics for certain purposes, such as military raincoats, which must be flexible at 0° C. and must be free of stickiness at 82° C. The present invention, which may be considered as a modification or improvement of the Kingsley patent, meets these and other requirements.

It is therefore an object of this invention to provide a new composition of matter.

It is another object to provide a coated or impregnated fabric which will not become sticky or tacky at elevated temperatures.

A further object is to provide a coated fabric which will retain its original suppleness at low temperatures and be economical to manufacture.

An additional object is to provide a process of treating polyvinyl acetal resins to render them heat resistant.

It is also an object to provide a process of preparing coated fabrics having heat resistant and flexible coatings.

Other objects will become apparent as the description proceeds.

These and other objects are accomplished by preparing a coating comprising the reaction product of a polyvinyl acetal resin and a monohydric alcohol-urea-formaldehyde reaction product, the latter preferably being a resinous material.

Although I do not desire to be limited thereto, it is believed that two molecules of the polyvinyl acetal resin are cross-linked by the monohydric alcohol - urea - formaldehyde reaction product in a manner similar to a letter "H." This may be visualized by assuming that the two vertical lines represent two molecules of the polyvinyl acetal and the horizontal line represents one molecule of the urea-formaldehyde reaction product. The reaction, which is believed to result in the cross-linking, is effected by a heat treatment.

In the preferred embodiment of the invention, the two resins mentioned above, suitably compounded with plasticizers and pigments, are applied to a fabric base by spreading a dispersion of the mass thereon, or applying a film of the mass thereto, and thereafter subjecting the coated fabric to a heat treatment, for example, of approximately 116° C. to effect the reaction between the two resins as mentioned above, and render the coating heat resistant. This is believed to involve a cross-linking.

As used herein, the phrase "heat resistant" means that the material to which it refers will show no evidence of adhesion or exudation when a 2 x 4 inch sample is doubled, coating to coating, placed between two glass plates, weighted with a 1 pound weight, heated for 30 minutes at 82° C. in a thermostatically controlled oven, cooled for 5 minutes, and separated.

As used herein, the term "insoluble" means that the material to which it refers will show no evidence of any appreciable solubility of the polyvinyl acetal when a few drops of methyl ethyl ketone or ethyl alcohol (solvents for polyvinyl butyral resin) are allowed to stand for 1 minute on the coating to be tested.

The advantages of this invention are only achieved after the polyvinyl acetal-urea-formaldehyde components have been subjected to a sufficiently high temperature for sufficient duration to effect the reaction which is believed to involve the cross-linking referred to above, and the amount of heat and time required for satisfactory evaporation of the volatile solvents is not sufficient to accomplish this.

The invention may be more readily understood by the following examples, which are given by the way of illustration and not as a limitation.

Example 1

| | Parts |
| --- | --- |
| Polyvinyl butyral resin | 5 |
| 50% solution of isobutanol-modified urea-formaldehyde resin in n-butanol | 2 |
| Ethyl alcohol | 10 |
| Ethyl acetate | 10 |

After thoroughly dispersing the above composition by mixing, a clear transparent film was cast on a glass plate and heated in an oven at 116° C. for 3 hours to remove the solvent and effect cross-linking of the butyral and urea-formaldehyde resins. The baked film was slurried in methyl ethyl ketone and centrifuged to remove sediment. The clear liquor was decanted and evaporated to dryness.

Only 1.4% of soluble material was extracted by the above procedure, which indicated that the films had been rendered substantially insoluble.

The heat treatment also rendered the film substantially insoluble in a mixture of equal parts of ethyl acetate and ethyl alcohol, which is an active solvent mixture for the film before heat treating it as described above.

The particular polyvinyl butyral resin used in this example contained 10-13% hydroxyl calculated as polyvinyl alcohol (hydroxyl number about 127-166).

The particular isobutanol-modified urea-formaldehyde resin used in this example contained from .5 to 1 mol of combined isobutanol and approximately 2 mols of formaldehyde per mol of urea, and was taken off with 7-10% of water.

*Example 2*

| | Parts |
|---|---|
| Polyvinyl butyral resin of Example 1 | 5 |
| 50% solution of the isobutanol-modified urea-formaldehyde resin of Example 1 in n-butanol | 1 |
| Sebacic di-ester of monobutyl ether of ethylene glycol | 2.5 |
| Ethyl alcohol | 10 |
| Ethyl acetate | 10 |

The above composition was thoroughly dispersed and a clear transparent film was cast on a glass plate. The dried film was heated for 2 hours at 116° C. to effect suitable cross-linking of the polyvinyl butyral and urea-formaldehyde resins, in which one molecule of the urea-formaldehyde resin attached itself to free hydroxyl groups of two polyvinyl butyral molecules. The heat cured film was slurried in methyl ethyl ketone and the sediment was removed by centrifuging. Petroleum ether was added to the methyl ethyl ketone liquor to precipitate any film forming materials which might have been dissolved in the methyl ethyl ketone, but no substantial precipitate was obtained. The methyl ethyl ketone-petroleum ether liquor was evaporated and an oily liquid remained. After extracting the plasticizer by the above procedure, the reacted film forming materials were completely insoluble in methyl ethyl ketone, which is a solvent for both the urea-formaldehyde and butyral resins before being rendered insoluble by the reacting procedure.

*Example 3*

A coated fabric suitable for military raincoat material was prepared in the manner indicated below by first preparing the following composition:

| | Parts |
|---|---|
| Polyvinyl butyral resin | 14.25 |
| 50% solution of n-butanol-modified urea-formaldehyde resin in n-butanol | 1.50 |
| Phthalic di-ester of monobutyl ether of ethylene glycol | 12.03 |
| Pigments | 27.44 |
| Ethyl alcohol | 44.78 |

The above composition was prepared by grinding the pigments in the phthalic di-ester of monobutyl ether of ethylene glycol and separately dissolving the butyral resin in the ethyl alcohol. The urea-formaldehyde resin solution was added to the ground pigments and the butyral solution and thoroughly mixed.

A cotton fabric running 3.60 yards per pound per 40" width having a thread count of 56 x 60 was sulfured dyed and desized. The fabric was singed on the coating side to remove excess protruding fibers, or nap, and passed between heated calender rolls under heavy pressure to flatten any unremoved protruding fibers. Two coats of the above composition were applied to the singed side of the fabric by means of a doctor knife as disclosed in Anderson Patent No. 2,107,276. The volatile solvents were expelled by passing the coated fabric through a heated drying chamber, such as disclosed in Anderson and Henry Patent No. 2,107,275. The partially coated fabric was then passed between heated calender rolls under heavy pressure to flatten and close any pinholes in the coating, after which the fabric was given sufficient additional coats of the above composition, drying after each coat, to deposit 3 to 6 oz. of non-volatile ingredients per square yard of fabric. The surface of the dried coating was then dusted with mica flakes to remove surface tack and allow the fabric to stand in rolls for an indefinite period before further processing. The mica prevents a slight adhesion of the coating to the uncoated side of the fabric while in roll form.

At this stage, the coated fabric is satisfactory at normal room temperatures, but is unsatisfactory at temperatures of approximately 82° C., because the butyral resin becomes soft and sticky.

The coated fabric was further treated by festooning in a heated chamber for 1 hour at 116° C. to effect the reaction between the butyral and urea-formaldehyde resin which is believed to involve a cross-linking. After the heat treatment described above, the solubility of the coating on the fabric was decreased considerably. The cured coating was also "heat resistant," and the fabric retained its original room temperature suppleness at 0° C.

When another lot of this coated fabric was further treated by festooning in a heated chamber for 2 hours at 105° C., similar results were obtained.

The amount of urea-formaldehyde resin in the above coating composition was sufficient to render the coating "heat resistant," but insufficient to render the coating "insoluble," as in Examples 1 and 2.

A raincoat was fabricated from the above-described coated fabric by stitching different sections together in the usual manner and adhering a narrow strapping of the same coated fabric over the stitched seams, the adhesiveness of the coating on both the strapping and the area immediately adjacent to the stitched seam being activated by applying a solvent mixture of 75 parts n-butanol and 25 parts butyl acetate. A slight pressure was applied to the superposed fabrics with a hand roller and the activating solvent was allowed to evaporate at room temperature.

The particular polyvinyl butyral resin used in this example contained 20% hydroxyl calculated as polyvinyl alcohol.

The particular n-butanol-modified urea-formaldehyde resin used in this example contained from .5 to 1 mol of combined n-butanol and approximately 2 mols of formaldehyde per mol of urea, and was taken off with 4-6% of water.

*Example 4*

A coated fabric suitable for fabricating military raincoats was prepared in the manner described in Example 3, except that the following composition was employed:

| | Parts |
|---|---|
| Polyvinyl butyral resin of Example 3 | 14.0 |
| 50% solution of the n-butanol-modified urea-formaldehyde resin of Example 3 in n-butanol | 3.6 |
| Sebacic di-ester of monobutyl ether of ethylene glycol | 11.7 |
| Pigments | 26.7 |
| Ethyl alcohol | 44.0 |

The coated fabric was stored in roll form at this stage. At a later date, a military raincoat was fabricated therefrom, employing full cement (unstitched) seams formed by so overlapping different sections of the garment that the uncoated side of one section would contact the coated side of another. The adhesiveness of the coating was activated with a solvent mixture of 75 parts n-butanol and 25 parts butyl acetate and the two surfaces were brought together under sufficient pressure to form a firm bond, a slight pressure applied by a hand roller usually being sufficient. The completely fabricated coat was then subjected to a temperature of 116° C. for 1 hour to effect the reaction between the butyral and urea-formaldehyde resins which is believed to involve a cross-linking. This made the cured coating "heat resistant," and reduced its solubility, but did not render it completely insoluble. The coat also retained its original room temperature suppleness at 0° C.

The polyvinyl butyral resins used in the above examples may be produced by the methods disclosed in Robertson Patent No. 2,162,678.

The monohydric alcohol-modified urea-formaldehyde resins used in the above examples may be prepared according to the disclosure in Edgar and Robinson Patent No. 2,191,957.

Although only n-butanol- and isobutanol-modified urea-formaldehyde resins are disclosed in the above examples, other lower aliphatic monohydric alcohols, such as methyl and ethyl alcohol, may be used as modifying agents where water sensitivity is not objectionable.

The following table indicates the ratio of polyvinyl butyral resin to urea-formaldehyde resin, on a dry basis, together with the heat resistance obtained, using the particular resins of the examples.

| | Ratio of polyvinyl butyral resin to urea-formaldehyde resin (dry basis) | | Temp. of Heat Cure | Time of Heat Cure | Coating Rendered Heat Resistant |
|---|---|---|---|---|---|
| | Polyvinyl Butyral | Urea-formaldehyde | | | |
| | | | °C. | Hours | |
| Ex. 1 | 83.4 | 16.6 | 116 | 3 | Yes. |
| Ex. 2 | 91.0 | 9.0 | 116 | 2 | Yes. |
| Ex. 3 | 95.0 | 5.0 | 116 | 1 | Yes. |
| Ex. 4 | 88.6 | 11.4 | 116 | 1 | Yes. |

In the preferred embodiment of this invention, at least 3.5 parts of urea-formaldehyde resin are used per 96.5 parts of butyral resin to obtain a heat resistant coating which is substantially insoluble.

Ratios as low as 1 part of the urea-formaldehyde resin, or even less, to 99 parts of the acetal resin produce heat resistance which is satisfactory for many purposes, but at such ratios the insolubility of the film is not so complete and a much longer curing time is necessary. For these reasons, in coating material to be used under widely separated and adverse conditions of temperature such as encountered by army raincoats and the like, the preferred embodiment of the invention is the higher ratios as shown by the examples.

While the above examples disclose the use of as high as 16.6 parts of urea-formaldehyde resin to 83.4 parts of polyvinyl butyral resin, or a ratio of about 1 to 5, somewhat higher ratios, such as 1 to 1, may be used for certain purposes. These higher ratios, however, are not used in the preferred embodiments since satisfactory heat resistance can be obtained with the lower ratios without unduly long heat treatment.

Since the time and temperature required for effecting the reaction which is believed to involve a cross-linking depends upon more than one factor; e. g., the degree of polymerization of the urea-formaldehyde reaction product, the amount of urea-formaldehyde reaction product, and the percentage of available hydroxyl groups in the polyvinyl acetal resin, it is not practical to establish definite limits for all possible permutations of time and heat required for sufficient reaction to produce heat resistance and reduced solubility, but they can be readily determined by those skilled in the art by following the teachings of this invention. In general, it has been found that the desired heat resistant condition cannot be obtained with the resins of the examples in a short enough time to be commercially practical if the heating is conducted at temperatures below about 82° C. Although the highest temperature specifically mentioned herein is 116° C., it will be understood that higher temperatures can be used, but these must be kept below the point at which there is substantial volatilization of the plasticizer used.

Although the sebacic and phthalic di-esters of mono-butyl ether of ethylene glycol are disclosed as plasticizers in some of the above examples, plasticizers are not critical in the present invention, since the heat resistance and reduced solubility of the coating is achieved by reacting the butyral and urea-formaldehyde resins. The use for which the material is intended will determine whether plasticizers or pigments are needed. Any other suitable plasticizers may be used, such as, dibutyl sebacate, diamyl adipate, dibutyl adipate, dicapryl phthalate, dibutyl phthalate, tricresyl phosphate, triphenyl phosphate, castor oil, or cottonseed oil. Siccative oils which are compatible with the film-forming materials may be used.

Under certain conditions, as where an extremely permanent plasticizer is desired, it is possible to use suitable alkyd resins. These may enter into the cross-linking reaction with the polyvinyl acetal resin and the urea-formaldehyde reaction product.

In the above examples, the polymeric or resinous reaction products of urea-formaldehyde are disclosed. The degree of polymerization may vary over a very wide range from substantially monomeric products to polymeric products approaching insolubility. Thiourea derivatives are also useful for the purposes of this invention.

Solvents other than ethyl alcohol, or mixtures of ethyl alcohol and ethyl acetate, may be used, but relatively low boiling solvents are preferred to facilitate their drying or evaporation.

As indicated in the examples, the compositions may be used to produce clear transparent coatings or they may be pigmented or dyed to produce colored coatings. The clear transparent coatings may be applied over fabrics having a solid color or a colored design printed thereon.

Rigid, semi-rigid, or flexible surfaces may be coated with the compositions of this invention, and these include various types of fabrics or paper. For example, in making a material similar to the so-called "oiled silk" but with improved properties, I may use silks ranging from 2¾ to 12 momme, as well as various types and weights of fabrics made of synthetic yarns, such as cellulose acetate, viscose, nylon, and cuprammonium cellulose. Cotton fabrics of various weights and weaves, and yarns, cords, etc., of various animal and vegetable fibers, can be conveniently coated or impregnated with the compositions of this invention. The amount of composition applied may vary over a wide range and will be largely governed by the weight and type of base material being treated, as well as the particular use for which the finished product is intended.

While the preferred embodiment is a coated fabric suitable for military raincoats, the invention will find great utility in the field of coated fabrics where other synthetic resins, rubber, or cellulose derivatives, have been used. Present day military requirements are that coated fabrics be useful at −40° C., as well as at 49° C., since it is not known where they will be used, and the products of this invention are particularly useful under extreme temperatures. A few typical examples of other suitable military products are in ground cloth, food bags, medical and service kits, recognition or signal panels, hospital sheeting, aprons, sleeping bags, and paulins. A few typical civilian uses include upholstery, case covering, shoe and slipper material, refrigerator bowl covers, refrigerator bags, shower curtains, and umbrellas. The relatively insoluble nature of the coating makes it particularly useful for printers' blankets or draw sheets where the coating comes in contact with type-cleaning fluids.

It will therefore be apparent that the products of this invention possess many advantages over similar material made by prior processes, such as retention of flexibility and resistance to cracking at low temperatures, and retention of dry feel in hot and moist atmospheres. A further advantage is the insolubility or reduced solubility of the coating in materials which are solvents for the coating before the cross-linking is effected. A still further advantage is the absence of odor in the coating compositions. An additional advantage is the increased toughness of the film over a wide temperature range.

It is apparent that many widely different embodiments of this invention may be made without departing from the spirit and scope thereof; and, therefore, it is not intended to be limited except as indicated in the appended claims.

I claim:
1. The process of rendering polyvinyl butyral resins insoluble which comprises mixing from 83.4 to 96.5 parts of a polyvinyl butyral having a free hydroxyl content of from 10% to 20% calculated as polyvinyl alcohol with from 3.5 to 16.6 parts of a butanol modified urea-formaldehyde resin containing from .5 to 1 mol of combined butanol and 2 mols of formaldehyde per mol of urea, and thereafter heating the composition at a temperature of from 82° C. to 116° C. for at least one hour until two contiguous films thereof are non-adhesive when a 2 x 4 inch strip thereof is doubled, coating to coating, and placed under a one pound weight for 30 minutes at 82° C.

2. A composition of matter comprising the reaction product of from 83.4 to 96.5 parts of a polyvinyl butyral resin having a free hydroxyl content of from 10% to 20% calculated as polyvinyl alcohol with from 3.5 to 16.6 parts of butanol modified urea-formaldehyde resin containing from .5 to 1 mol of combined butanol and approximately 2 mols of formaldehyde per mol of urea, said reaction product having been obtained by heating the reactants at a temperature from 82° C. to 116° C. for at least one hour and until 2 contiguous films thereof are non-adhesive when a 2 x 4 inch strip thereof is doubled, coating to coating, and placed under a one pound weight for 30 minutes at 82° C.

3. A fabric having a cured coating firmly attached thereto of the composition of claim 2.

ERNEST A. RODMAN.

REFERENCES CITED

The following references are of record in the file of this patent:

UNITED STATES PATENTS

| Number | Name | Date |
|---|---|---|
| 1,073,858 | Kaufman | Sept. 23, 1913 |
| 1,860,098 | Jaeger | May 24, 1932 |
| 543,662 | Taylor | July 30, 1895 |
| 2,243,560 | Hall | May 27, 1941 |
| 2,169,250 | Izard | Aug. 15, 1939 |
| 2,171,882 | Ludwig | Sept. 5, 1939 |
| 2,201,891 | Edgar | May 21, 1940 |
| 2,268,121 | Kingsley | Dec. 30, 1941 |
| 2,279,745 | Stevenson | Apr. 14, 1942 |
| 2,275,008 | Coffman | Mar. 3, 1942 |

OTHER REFERENCES

"Uformite," pages 45 and 46 of "Synthetic Resins," pub. Apr. 1941, by Resinous Products & Chem. Co., Phila., Pa.

"Organic Chemistry," edited by Gilman, 2nd edition, pages 753–756, pub. 1943 by John Wiley & Sons, N. Y.